United States Patent
Krell et al.

(10) Patent No.: US 9,244,859 B2
(45) Date of Patent: Jan. 26, 2016

(54) BUS SUBSCRIBER FOR A BUS SYSTEM, BUS SYSTEM FOR A MOTOR VEHICLE, AND METHOD FOR ALLOCATING ADDRESSES IN A BUS SYSTEM

(71) Applicant: AUDI AG, Ingolstadt (DE)

(72) Inventors: Stephan Krell, Hilpoltstein (DE); Wolf Goetze, Bad Neustadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/395,606

(22) PCT Filed: Apr. 30, 2013

(86) PCT No.: PCT/EP2013/001286
§ 371 (c)(1),
(2) Date: Oct. 20, 2014

(87) PCT Pub. No.: WO2013/170929
PCT Pub. Date: Nov. 21, 2013

(65) Prior Publication Data
US 2015/0134872 A1 May 14, 2015

(30) Foreign Application Priority Data
May 15, 2012 (DE) .......................... 10 2012 009 630

(51) Int. Cl.
*G06F 1/26* (2006.01)
*G06F 12/10* (2006.01)
*H04L 12/40* (2006.01)
*H04L 29/12* (2006.01)

(52) U.S. Cl.
CPC .............. *G06F 12/1081* (2013.01); *G06F 1/26* (2013.01); *H04L 12/40032* (2013.01); *H04L 12/40169* (2013.01); *H04L 61/2038* (2013.01); *H04L 2012/40234* (2013.01); *H04L 2012/40273* (2013.01)

(58) Field of Classification Search
CPC ............................... G06F 1/26; G06F 12/1081
See application file for complete search history.

(56) References Cited

U.S. PATENT DOCUMENTS

| 4,538,262 A | 8/1985 | Sinniger et al. |
| 7,668,991 B2 | 2/2010 | Kopplin |
| 8,972,641 B2 * | 3/2015 | Kropp ................ G05B 19/0423 341/101 |

(Continued)

FOREIGN PATENT DOCUMENTS

| DE | 101 23 802 A1 | 12/2002 |
| DE | 103 54 602 A1 | 6/2005 |

(Continued)

OTHER PUBLICATIONS

WIPO English language translation of the International Preliminary Report of Patentability for PCT/EP2013/001286, mailed Nov. 20, 2014, 6 pages.

(Continued)

*Primary Examiner* — Nimesh G Patel
(74) *Attorney, Agent, or Firm* — Staas & Halsey LLP

(57) ABSTRACT

A bus system that has at least two lines. A bus subscriber has at least one connection element that has at least two contacts that can each be connected to one of the lines. An address allocation device can be used to ascertain an address for the bus subscriber in the bus system on the basis of a respective connection state of the contacts with respect to the lines. Also, a method allocates addresses in the bus system.

11 Claims, 1 Drawing Sheet

(56) References Cited

U.S. PATENT DOCUMENTS

| | | |
|---|---|---|
| 2003/0201882 A1 | 10/2003 | Moore |
| 2005/0154474 A1 | 7/2005 | Kauntz et al. |
| 2008/0177919 A1 | 7/2008 | Miyazawa |

FOREIGN PATENT DOCUMENTS

| | | |
|---|---|---|
| DE | 103 58 106 A1 | 7/2005 |
| DE | 10 2007 041 941 A1 | 5/2008 |
| DE | 10 2009 002 867 A1 | 11/2010 |
| DE | 10 2012 009 630.5 | 5/2012 |
| EP | 1 139 609 A2 | 10/2001 |
| EP | 2 154 831 A1 | 2/2010 |
| EP | PCT/EP2013/001286 | 4/2013 |

OTHER PUBLICATIONS

C. Ress et al., "Adasis Protocol for Advanced In-Vehicle Applications," *ITS World Congress*, Nov. 2008, pp. 1-15.
Office Action issued Mar. 20, 2013 for corresponding German Patent Application No. 10 2012 009 630.5.
International Search Report mailed Jun. 14, 2013 for corresponding International Patent Application No. PCT/EP2013/001286.

* cited by examiner

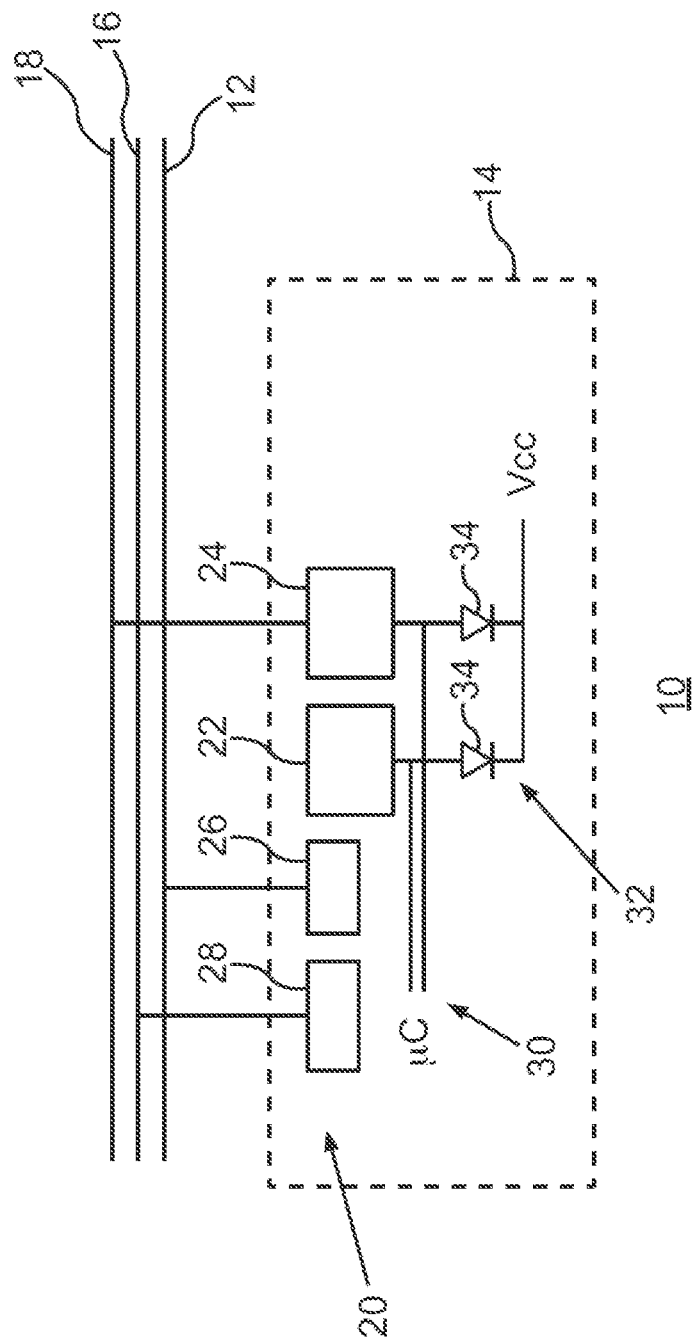

BUS SUBSCRIBER FOR A BUS SYSTEM, BUS SYSTEM FOR A MOTOR VEHICLE, AND METHOD FOR ALLOCATING ADDRESSES IN A BUS SYSTEM

CROSS REFERENCE TO RELATED APPLICATIONS

This application is based on and hereby claims priority to International Application No. PCT/EP2013/001286 filed on Apr. 30, 2013 and German Application No. 10 2012 009 630.5 filed on May 15, 2012, the contents of which are hereby incorporated by reference.

BACKGROUND

The invention relates to a bus subscriber for a bus system, a bus system for a motor vehicle and a method for allocating addresses in a bus system.

Bus subscribers for a bus system, bus systems and methods for allocating addresses in a bus system are sufficiently well known from mass production for motor vehicles and from the general related art, for example. Such a bus system is used for data transmission between a plurality of bus subscribers via a common transmission path where the subscribers are not involved in the data transmission between other subscribers.

Bus systems are used particularly in motor vehicles for connecting individual electronic bus subscribers in the form of controllers, which actuate respective control elements in the motor vehicle, for example. So that the bus subscribers are able to interchange data with one another and hence to communicate with one another, they are connected to one another by at least one line element, for example.

Such a line element may comprise one or more metal wires that are sheathed with a sleeve particularly composed of plastic. Signals and hence data, which are also called messages, to be transmitted between the bus subscribers are forwarded by voltage differences and encrypted or decrypted by a protocol, for example. In order to ensure error-free communication, the bus subscribers on the bus system require a respective explicit address, so that each bus subscriber can be explicitly identified. The allocation of the addresses for the bus subscribers is also called coding. For automatic address allocation, there is the possibility of isolating the bus system at each bus subscriber, for example, and forwarding messages, i.e. the signals, only conditionally or performing electrical measurements. This results in a high level of cabling complexity and also in high susceptibility to error. Alternatively, a separate wire can be used and laid for performing the address allocation. The general related art also discloses methods in which additional contacts of a connector for the bus subscribers are used differently or passive components are installed in the connector.

DE 101 23 802 B4 reveals it to be known practice to provide such coding by EEPROM or by connector codings, for example. Furthermore, DE 101 23 802 B4 reveals a control system for controlling electronically actuatable motor vehicle components to be known. The control system comprises a single-wire bus system with at least one super ordinate control device with at least two further subscribers that are each associated with at least one motor vehicle component. In this case, the super ordinate control device and the further subscribers are connected to one another via a bus that comprises at least two data lines. At least one switching apparatus is provided that is controlled by the super ordinate control unit and that can specifically either disconnect or connect each of the at least two further subscribers individually.

EP 1 139 609 A2 discloses a bus system with a plurality of bus subscribers, wherein each bus subscriber is connected to at least two connecting lines. In this case, provision is made for each bus subscriber to have an associated electronic circuit portion. The circuit portion can be connected to the connecting lines in different connection combinations. The connection portion recognizes the respective connection combination of the connected connecting lines and codes the bus subscriber on the basis of the recognized connection combination.

US 2005/015474 A1 discloses a sensor element for a bus system in a motor vehicle. The sensor element has a first number of contact connections that can be used to connect the sensor element to the bus lines of the bus system, which have different potentials. In this case, provision is made for the first number to be greater than the number of bus lines. In addition, a first device is provided that measures and evaluates the potential at at least one of the contact connections. Furthermore, a second device is provided that allocates a specific address coding to the sensor element from the measured and evaluated potential.

US 2003/0201882 A1 reveals an addressable monitoring system to be known. The monitoring system comprises a plurality of sensors. Each of the sensors can be connected to a wiring harness that comprises four lines. Contacts can be used to connect the respective sensor to the lines. Depending on the connection state of two of these contacts, the respective sensor can determine it own address.

Finally, U.S. Pat. No. 4,538,262 discloses a bus subscriber with contacts that can be used to connect the bus subscribers to lines of a bus system. An address for the bus subscriber can be allocated on the basis of a respective connection state of the contacts with respect to the lines.

DE 103 54 602 A1 reveals a bus system for a motor vehicle to be known that has at least two bus subscribers. The bus system has at least one data line as a first line, at least one power supply line as a second line and at least one ground line as a third line. The bus subscribers also each have at least one connection element that comprises at least two contacts. The contacts can each be connected to one of the lines.

A first of the contacts is a voltage connection that can be connected to the power supply line. The second contact is a data communication connection that can be connected to the data line. The respective connection element also comprises a third contact, which is a ground connection and can be connected to the ground line. Furthermore, a fourth contact of the respective connection element is provided, which is a configuration connection.

The configuration connection is used for the address allocation of the bus subscriber, that is to say for coding. In this case, the configuration connection may be connected to the power supply line or to the data line or to the ground line or open, so that four states and hence four address options are provided. The provision of this additional configuration connection results in a relatively high level of cabling complexity for the bus subscriber and hence for the bus system.

SUMMARY

It is therefore one possible object to provide a bus subscriber, a bus system and a method for allocating addresses in a bus system that allow particularly simple address allocation.

The inventors propose as a first aspect, a bus subscriber for a bus system having at least two lines. The bus subscriber comprises at least one connection element that has at least two contacts. The contacts can each be connected to one of the lines.

In order to provide simple address allocation for the bus subscriber in the bus system and for the purpose of simple and inexpensive provision of a large number of address options, an address allocation device of the bus subscriber is provided that can be used to ascertain an address for the bus subscriber in the bus system on the basis of a respective connection state of both contacts with respect to the lines. The evaluation of the connection state of both contacts allows just a very small number of lines in the bus system and just a very small number of contacts of the bus subscriber to be used to provide a very large number of combination options and hence a very large number of address options and hence of different addresses by varying the contacts or the connection state thereof with respect to the lines. This allows particularly the cabling complexity and hence the costs of the bus subscriber to be kept down.

Depending on the connection state of the contacts, corresponding electrical potential or voltage ratios arise between the contacts, which means that the relevant address of the bus subscriber can be ascertained and hence the coding can be performed. In this case, the contacts may be connected to different lines or the same line in the bus system. It is likewise possible for one of the contacts to be connected to one of the lines and for the other contact to be open. By way of example, it is also possible for both contacts to be open, that is to say not to be connected to a line.

In order to provide an even greater number of address options, the connection element may have an even higher number of contacts, i.e. at least three contacts, the address allocation device being able to be used to ascertain the address of the bus subscriber on the basis of a respective connection state of these at least three contacts. Alternatively, or additionally, it is possible for the bus system to have a relatively high number of lines, i.e. at least three lines, to which the contacts of the connection element can be connected. This also allows a very high number of address options to be provided easily.

A first of the lines of the bus system is a ground line, for example, that can be used to connect the bus subscriber to the ground. The second line may be a power supply line that can be used to connect the bus subscriber to a power supply and hence to supply it with electric current. In this case, provision may be made for a data line to be integrated into the power supply line. This means that the transmission of signals and hence data takes place via the power supply line. Alternatively, the bus system may have a third line that is in the form of a data line. Hence, the data transmission takes place via the data line, which is separate from the power supply line.

According to the proposal, the address of the bus subscriber in the bus system can be ascertained by the address allocation device on the basis of the respective connection state of the contacts with respect to in the lines by connecting at least one of the contacts to the relevant line in the form of a power supply line. Hence, the at least one contact, which is used for supplying power to the bus subscriber anyway, is used for the address allocation, which means that the address can be ascertained in a particularly simple manner. The address allocation in the bus system can therefore be provided in a simple manner such that, in the case of a plurality of bus subscribers, at least one of the contacts is connected to the power supply line in each case, while the other contact is likewise connected to the power supply line or to another of the lines of the bus system or open. Thus, a simple coding method for address allocation in the bus system is provided in which, for the purpose of address allocation, at least one of the contacts that can be used to connect the relevant bus subscriber to the power supply line, or the connection state of said contact, is varied while, for each of the bus subscribers preferably one of the respective contacts is connected to the power supply line.

In addition, a supply device that is coupled to the contacts is provided that can be used to convert an external supply voltage, which can be supplied to the bus subscriber by connecting the at least one contact to the power supply line, into an internal supply voltage of the bus subscriber. For the purpose of address allocation, electrical voltages or potentials on the contacts are evaluated, which does not require a communication protocol. Depending on the connection state of the contacts, the voltages on the contacts or a voltage difference or an electrical voltage ratio between the contacts can vary. The supply device then allows this external supply voltage or the respective electrical voltages on the contacts to be converted into the internal supply voltage, so that the bus subscriber is supplied with the at least substantially identical internal supply voltage, and hence can be operated, even for different connection states of the contacts. To this end, the supply device comprises internal diodes or active rectification with MOSFETs, for example.

For the purpose of simple and uncomplex provision of a particularly high number of address options, a further embodiment has provision for the connection element of the bus subscriber to have at least one further contact that can be connected to one of the lines, wherein the address of the bus subscriber in the bus system can be ascertained by the address allocation device on the basis of the respective connection state of the now at least three contacts with respect to the lines.

The inventors also propose as a second aspect, a bus system for a motor vehicle, with at least two lines and with at least two bus subscribers with at least one connection element each. The respective connection element comprises at least two respective contacts that can each be connected to one of the lines.

In this case, the bus subscribers each have an address allocation device that can be used to ascertain a respective address for the bus subscribers in the bus system on the basis of a respective connection state of the contacts of the respective bus subscriber with respect to the lines. Advantageous embodiment of the first aspect can be regarded as an advantageous embodiment of the second aspect, and vice versa. In the case of the bus system, it is possible to provide a particularly high number of address options in a simple and uncomplex and hence inexpensive manner.

According to the proposal, one of the lines is in the form of a power supply line that can be used to supply the bus subscribers with electric current. In this case, at least one of the contacts of the respective bus subscriber is connected to the power supply line. The allocation of different addresses therefore takes place in the case of the at least two bus subscribers by virtue of evaluation of the connection state of the contact that is used for supplying power anyway, and hence in a simple manner.

In addition, the respective bus subscriber comprises a supply device that is coupled to the respective contacts and that can be used to convert an external supply voltage, which can be used to supply the respective bus subscriber by connecting the at least one respective contact to the power supply line, into an internal supply voltage of the bus subscriber.

In the case of a plurality of bus subscribers, provision is preferably made for at least one of the contacts of the respective bus subscriber to be connected to the power supply line. The accordingly other contact may likewise be connected to the power supply line in the case of just one of the bus subscribers, in which case the accordingly other contact in the case of the other bus subscriber or in the case of the other bus subscribers has a different connection state therefrom, the bus subscribers having different combinations of the connection states of the respective contacts. Hence, each bus subscriber can be allocated an explicit address in the bus system. The bus system therefore has provision for the allocation of different addresses by virtue of at least one of the contacts for supplying power being varied.

In the bus system, it is also possible for other bus subscribers to communicate that have addresses firmly prescribed in their hardware, for example. In addition, it is possible for the outlined coding to be reused in the bus system for each hardware variant. In this case, bus subscribers associated with a first hardware variant can use the address options provided by the outlined coding together with a first coding number that is associated with the first hardware variant. Bus subscribers associated with a second hardware variant can use the address options provided by the outlined coding together with a second coding number that is associated with the second hardware variant. In this way, a multiplicity of different addresses can easily be provided.

The inventors also propose a motor vehicle with at least one bus subscriber and/or with at least one bus system. The simple and noncomplex address allocation allows very high cost savings to be achieved particularly on account of effects of scale for mass production of motor vehicles.

The inventors further propose, according to a third aspect, a method for allocating addresses in a bus system that has at least two lines and comprises at least two bus subscribers, wherein the bus subscribers each comprise at least one connection element that has at least two contacts that can each be connected to one of the lines. In this case, the bus subscribers are allocated a respective address in the bus system.

In order to provide simple and inexpensive address allocation, provision is made for the respective address to be ascertained by an address allocation device, particularly of the respective bus subscriber, on the basis of a respective connection state of the contacts with respect to the lines. Advantageous embodiments of the first two aspects can be regarded as an advantageous embodiment of the third aspect, and vice versa.

The respective address of the relevant bus subscriber is ascertained by connecting at least one of the contacts of the respective bus subscriber to one of the lines, which is in the form of a power supply line. Hence, the connection state of the contact used for supplying power to the bus subscriber anyway is used. Additional configuration contacts for the allocation of explicit addresses can therefore be avoided, which means that the cabling complexity of the bus subscribers and the bus system can be kept down.

In addition, the respective bus subscriber comprises a supply device that is coupled to the respective contacts and that is used to convert an external supply voltage, which is used to supply the respective bus subscriber by connecting the at least one respective contact to the power supply line, into an internal supply voltage of the bus subscriber.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The single FIGURE of the drawing shows a basic illustration of a bus system in which bus subscribers of the bus system are allocated explicit addresses in a simple manner by evaluating a respective connection state of two contacts of a respective connection element of the bus subscribers.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The FIGURE shows a bus system 10 with three lines. A first of the lines is a data line 12. In the present case, the data line 12 is associated with what is known as an LIN bus (single-wire bus). The substance outlined in advance below can also readily be transferred to other buses such as a CAN bus, however.

The data line 12 can be used by bus subscribers of the bus system 10 to interchange electrical signals and hence data, which are also called messages, with one another and hence to communicate with one another. Of these bus subscribers, the FIGURE shows a bus subscriber very schematically and with the designation 14.

By way of example, the bus subscribers are a respective controller in a motor vehicle, for example in the form of an automobile. The respective controller is used to control or regulate, i.e. actuate, at least one control element of the motor vehicle.

As a second line, the bus system 10 comprises a ground line 16, which can be used to connect or which connects the bus subscriber 14 to the ground. As a third line, the bus system 10 comprises a power supply line 18, which is used to supply the bus subscribers with an electric current.

As can be seen in the FIGURE, the bus subscriber 14 has a connection element 20 with contacts 22, 24, 26, 28. The first contact 22 is also called code 1, since the first contact 22 is used to perform address allocation, i.e. coding of the bus subscriber 14, which means that the bus subscriber 14 is provided with an explicit address in the bus system 10. The second contact 24 is also called code 2, since the second contact 24 is also used for address allocation. Accordingly, the other bus subscribers also involve use of the contacts 22, 24 by virtue of variation of the connection states thereof with respect to the lines in order to allocate explicit addresses to the respective bus subscribers. This allows the bus subscribers to communicate with one another explicitly.

The third contact 26 is also called LIN, since the third contact 26 is connected to the data line 12 associated with the LIN bus. The fourth contact 28 is also called GND (ground), since the third contact 28 is connected to the ground line 16.

The ground, i.e. the ground line 16, and the fourth contact 28 are firmly allocated in the present case. This means that the fourth contact 28 of each bus subscriber is connected to the ground line 16. Accordingly, the third contact 26 of each bus subscriber is also connected to the data line 12. In the present case, the bus subscribers differ from one another only in respect of a respective combination of the connection states, i.e. of the connection of the contacts 22, 24 to the lines, which allows explicit addresses to be allocated.

In the case of the bus subscriber 14, the second contact 24 is connected to the power supply line 18, while the first contact 22 is open. The first contact 22 therefore has a first connection state in which the first contact 22 is open. The second contact 24 has a second connection state in which the second contact 24 is connected to the power supply line 18.

Coupled to the contacts 22, 24 is a microcontroller μC with an address allocation device 30 of the bus subscriber 14, the address allocation device 30 being able to be used to ascertain an address for the bus subscriber 14 on the basis of the respective connection state of the contacts 22, 24.

In the case of the other bus subscribers too, one of the contacts 22, 24 is coupled to the power supply line 18. Against the background of this constraint that in each bus subscriber at least one of the contacts is connected to the power supply line 18, five different address options are obtained:

First option: code 1 is connected to the power supply line 18 and code 2 is open.

Second option: code 1 is connected to the power supply line 18, and code 2 is connected to the ground line 16.

Third option: code 1 is connected to the power supply line 18, and code 2 is connected to the power supply line 18.

Fourth option: code 1 is open, and code 2 is connected to the power supply line 18. This fourth option is implemented in the case of the bus subscriber 14.

Fifth option: code 1 is connected to the ground line 16, and code 2 is connected to the power supply line 18.

These five address options can easily be implemented by varying at least one of the contacts 22, 24 for supplying power or the corresponding connection state thereof, so that the wiring complexity of the bus system 10 can be kept down and the bus subscribers can be designed in an at least essentially identical manner. In this case, the third contact 26 for data transmission is not influenced electrically.

A controller for the bus system 10 can check the correct address allocation by interrogating all bus subscribers. The bus subscribers can recognize errors by comparing the address after each address allocation with the preceding one. Admissible, i.e. legitimate, address changes need to be confirmed by the controller after all the bus subscribers have been recognized.

By way of example, it is also possible in the bus system 10 to reuse the outlined coding, i.e. the five address options, for each hardware variant of bus subscribers in each case and to combine it with at least one coding number, for example stipulated in the respective hardware variant. If, by way of example, five stop valves are provided as bus subscribers associated with a first hardware variant, five changeover valves are provided as bus subscribers associated with a second hardware variant and a pump is provided as a bus subscriber associated with a third hardware variant, then the first hardware variant, i.e. the stop valves, has an associated first coding number, the second hardware variant, i.e. the changeover valves, has an associated second coding number, which is different from the first coding number, and the third hardware variant, i.e. the pump, has an associated third coding number, which is different from the first and from the second coding number.

For the stop valves, it is then possible to use the aforementioned five address options together with the first coding number, which is the same for all the stop valves, as addresses. Accordingly, the aforementioned five address options together with the second coding number, which is the same for all the changeover valves, can be used as addresses for the changeover valves. For the pump, it is possible for the third coding number to be used as an address. It is thus possible to provide eleven different addresses in the bus system 10 in a simple manner.

In order to provide an even greater number of address options in a very simple manner, it is possible, by way of example, for the data line 12 also to be incorporated into the variation of the connection states of the contacts 22, 24 as well, i.e. for the contacts 22, 24 to be either also connected to the data line 12 or left open. In addition to the five address options outlined previously, two additional address options are then obtained, which means that the number of address options increases to seven:

Sixth option is: code 1 is connected to the data line 12, and code 2 is connected to the power supply line 18.

Seventh option: code 1 is connected to the power supply line 18, and code 2 is connected to the data line 12.

A further option provides for the ground line 16 and the data line 12 to be used for the address allocation, i.e. the coding, in addition to the power supply line 18 or instead of it.

From this, it can be seen that the address allocation takes place internally in the bus subscriber by the address allocation device 30 by virtue of the contacts 22, 24 being checked for their connection states.

Furthermore, the bus subscriber 14 comprises a supply device 32 with two internal diodes 34 that are connected to the contacts 22, 24 for supplying power. The supply device 32 can be used to convert an external supply voltage, which can be supplied to the bus subscriber 14 by connecting at least one of the contacts 22, 24 to the power supply line 18, into an internal supply voltage Vcc of the bus subscriber, so that the internal supply voltage Vcc is obtained and the bus subscriber 14 can be operated. It is thus possible for the bus subscribers to be collectively supplied with the at least essentially identical internal supply voltage Vcc in the case of the bus subscribers despite different connection states of the contacts 22, 24.

The simple address allocation by virtue of the evaluation of the connection states of the contacts 22, 24 allows the bus subscribers to be of essentially the same design and thus to comprise a very large number of identical parts, which results in cost savings.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A bus subscriber for a bus system having at least two lines, one of the lines being a power supply line, the bus subscriber comprising:
    a connection element that has at least first and second contacts that can each be connected to one of the lines;
    an address allocation device to ascertain an address for the bus subscriber in the bus system based on respective connection states of the first and second contacts with respect to the lines, at least one of the first and second contacts being connected to the power supply line; and
    a supply device coupled to the first and second contacts to convert an external supply voltage supplied to the bus subscriber by connection to the power supply line, into an internal supply voltage of the bus subscriber.

2. The bus subscriber as claimed in claim 1, wherein
    the connection element has at least three contacts that can be connected to one of the lines, and
    the address allocation device ascertains the address for the bus subscriber based on respective connection states of the at least three contacts with respect to the lines.

3. The bus subscriber as claimed in claim 1, wherein
    the lines comprise a ground line, the power supply line and a data line, the first and second contacts each have a connection state selected from the group consisting of a connection to the ground line, a connection to the power supply line and an open connection state, and at least one of the first and second contacts is connected to the power supply line.

4. The bus subscriber as claimed in claim 3, wherein the connection element comprises the first and second contacts, a dedicated ground contact connected to the ground line and a dedicated data contact connected to the data line.

5. The bus subscriber as claimed in claim 1, wherein
there are at least three lines with one of the lines being the power supply line, and
each of the first and second contacts can be connected to one of the three lines or can be open, such that each contact has at least four possible connection states.

6. The bus subscriber as claimed in claim 1, wherein
the bus subscriber is a hardware controller,
a code number is assigned to the hardware controller, and
the address allocation device ascertains the address for the bus subscriber based on the code number and based on the respective connection states of the first and second contacts.

7. The bus subscriber as claimed in claim 1, wherein the supply device provides a substantially identical internal supply voltage to the bus subscriber regardless of the respective connection states of the first and second contacts.

8. A bus system for a motor vehicle, comprising:
at least two lines, one of the lines being a power supply line; and
at least two bus subscribers, each bus subscriber comprising:
a connection element that has at least first and second contacts that can each be connected to one of the lines;
an address allocation device to ascertain a respective address for the bus subscriber in the bus system based on respective connection states of the first and second contacts of the respective bus subscriber with respect to the lines, at least one of the first and second contacts of the respective bus subscriber being connected to the power supply line; and
a supply device that is coupled to the first and second contacts to convert an external supply voltage supplied to the respective bus subscriber by connection to the power supply line, into an internal supply voltage of the bus subscriber.

9. The bus system as claimed in claim 8, wherein for each bus subscriber:
the connection element has at least three contacts that can be connected to one of the lines, and
the address allocation device ascertains the address for the bus subscriber based on the respective connection states of the at least three contacts with respect to the lines.

10. A motor vehicle comprising a bus system as claimed in claim 8.

11. A method for allocating addresses in a bus system that has at least two bus subscribers and at least two lines, one of the lines being a power supply line, each bus subscriber comprising a connection element that has at least first and second contacts that can each be connected to one of the lines, the method comprising:
for each bus subscriber, connecting at least one of the first and second contacts to the power supply line;
for each bus subscriber, allocating a respective address in the bus system, the respective address being ascertained by an address allocation device provided in each bus subscriber, the address being ascertained based on connection states of the first and second contacts of the bus subscriber with respect to the lines; and
for each bus subscriber, using a supply device that is coupled to the first and second contacts to convert an external supply voltage, which is supplied to the respective bus subscriber by connection to the power supply line, into an internal supply voltage of the bus subscriber.

* * * * *